Aug. 16, 1966 W. JELLIG 3,266,343

PHOTO TRANSFER DRILLING MACHINE

Filed Oct. 22, 1963 3 Sheets-Sheet 1

INVENTOR.
WALTER JELLIG
BY
Raymond R. Stolnick

PHOTO TRANSFER DRILLING MACHINE

Filed Oct. 22, 1963 3 Sheets-Sheet 2

INVENTOR.
WALTER JELLIG
BY
Raymond R. Skolnick

INVENTOR.
WALTER JELLIG
BY
Raymond R. Skolnick

United States Patent Office 3,266,343
Patented August 16, 1966

3,266,343
PHOTO TRANSFER DRILLING MACHINE
Walter Jellig, Franklin Square, N.Y., assignor to Sperry Rand Corporation, Ford Instrument Company Division, Long Island City, N.Y., a corporation of Delaware
Filed Oct. 22, 1963, Ser. No. 317,996
5 Claims. (Cl. 77—64)

The instant invention relates to drilling machines in general and more particularly relates to a drilling machine having means for accurately and conveniently positioning work relative to the drill.

Utilizing prior art devices, the drilling of holes in small quanities of printed circuit boards is carried out by sensitizing a circuit board blank and thereafter utilizing a photomaster to print a circuit of the art work on the circuit board. Each pad of the printed circuit that is to have a hole drilled in it is first center punched and then drilled or else an optical pickup in line with the drill spindle is sighted through to position the drill, and then drilling takes place.

When drilling takes place from the side opposite the sensitized side there is a tendency for the drill to push the copper away from the board thereby causing "delamination." When drilling is done from the sensitized side, after each sighting operation the optical device must be removed and replaced by the drill. Further, the drilling operation causes burrs to be raised on the sensitized side of the board.

The instant invention overcomes the disadvantages of the prior art by providing a device in which there is a sighting means mounted remote from the drill spindle. More particularly, the sighting means is mounted for movement in unison with the work table upon which the printed circuit boards are mounted. The optical device is sighted on a photomaster mounted on a stationary table remote from the work table. As the optical device is positioned in a desired location directly above a selected point on the photomaster, the work table is moved so that the printed circuit boards are in proper position relative to the drill spindle.

A clamping means is then actuated to hold the work table and printed circuit boards in position during the drilling operation. The clamp is provided with a guide means which serves to direct the drill during the drilling operation and also bears against the printed circuit element adjacent to the hole being drilled thereby preventing the formation of burrs.

Accordingly a primary object of the instant invention is to provide a novel machine for the drilling of printed circuit boards.

Another object is to provide a machine of this type in which sighting and drilling take place on the same side of the printed circuit board yet the sighting device is not mounted in line with the drill spindle.

Still another object is to provide a device of this type in which sighting is done on a photomaster mounted remote from the printed circuit board to be drilled.

A further object is to provide a device of this type in which the sighting means is movably mounted in unison with the work table upon which the printed circuit boards are mounted.

A still further object is to provide a device of this type having a drill guide and clamp means to prevent the formation of burrs.

These as well as further objects of this invention shall become readily apparent after reading the following description of the accompanying drawings in which:

In FIGURE 5 the guide is locked in position while in FIGURE 6 the guide is released so as to be withdrawable from the clamp.

Figure 1:
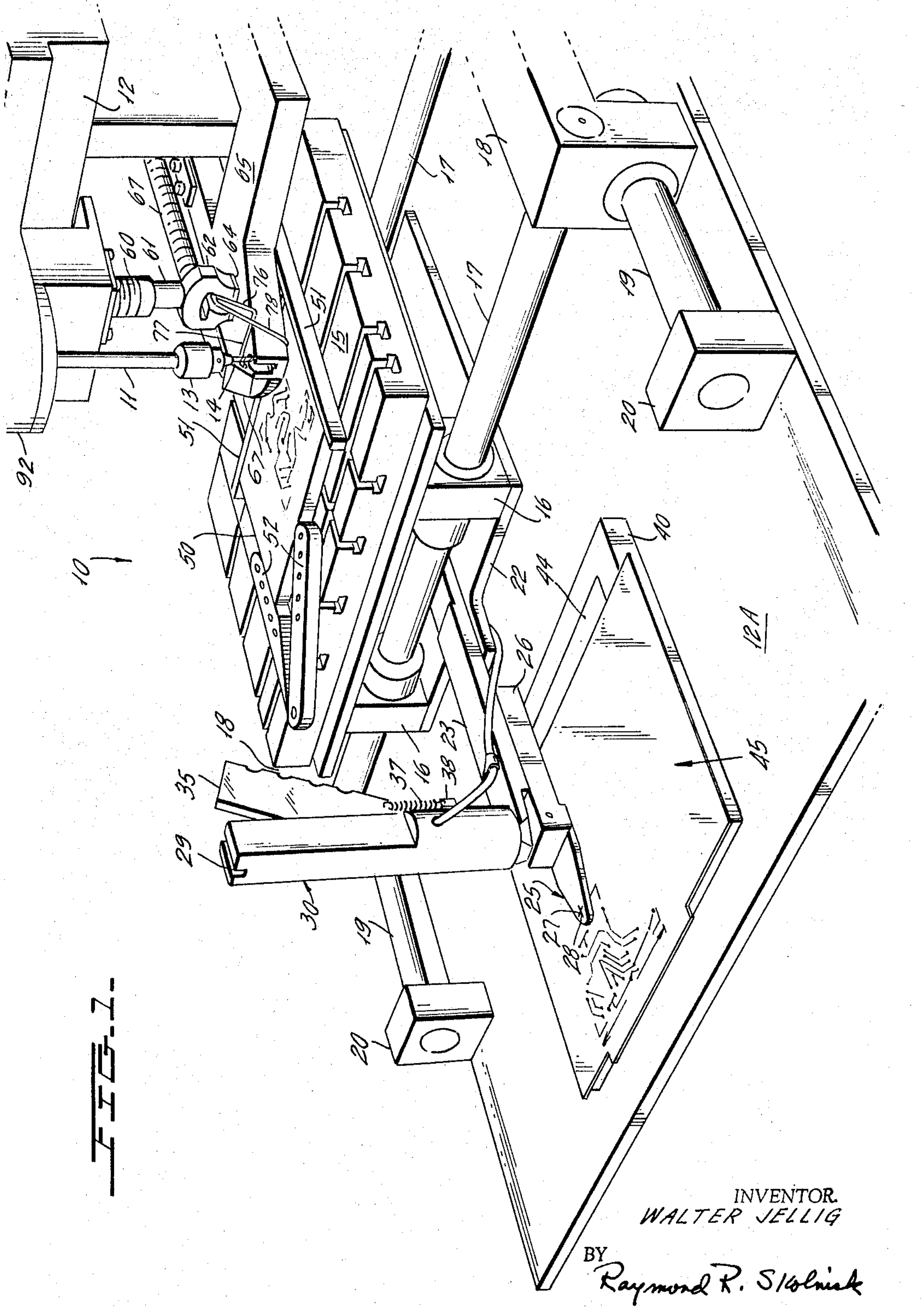
FIGURE 1 is a perspective illustrating a drilling machine constructed in accordance with the teachings of the instant invention.

Now referring to the figures. Drilling machine 10 is provided with a conventional rotatable spindle 11 mounted for vertical reciprocating movement with respect to frame 12. Chuck 13 at the lower end of spindle 11 holds drill 14. Spindle 11 is mounted over work table 15 having downward extensions 16 which carry bearing means through which guide rods 17 extend. The ends of rods 17 are secured to carriages 18 slideably mounted to guide rods 19 whose ends are secured to blocks 20.

Thus, it is seen that work table 15 is mounted for front and back movement which is journaled through the cooperation of rods 19 and the bearings carried by carriages 18. In addition, work table 15 is mounted for side to side movement with this movement being journaled by rods 17 in cooperation with the bearings carried extensions 16.

Work table 15 is mounted at the top of extension 16 while stabilizing plate 22 is mounted at the lower ends of extensions 16. Member 23, fixedly secured to plate 22 and extending forwardly therefrom, carries sighting device 25 consisting of transparent sheet-like member 26 having cross hairs 27, 28 at the forward end thereof. Pins 31, 32 mount member 26 to member 23 with limited relative vertical movement being possible between these two members. Pin 31 is press fitted to member 23 and is relatively loosely fitted to member 26. Pin 32 is press fitted to member 26 and is relatively loosely fitted to member 23 and post 30. The latter is mounted to the forward end of member 23 on the upper surface thereof.

The upper end of pin 32 is provided with hook-like formation 33 which extends into slot 29 in post 30. Slot 29 houses trigger 35 which is pivotally mounted to post 30 by means of pin 34. In the position shown in FIGURE 3, hook-like formation 33 of pin 32 is engaged by hook-like formation 36 of trigger 35. Tension spring 37, anchored at one end to trigger 35 and at the other end to thumb screw 38 extending from post 30, biases trigger 35 in a counterclockwise direction about pivot pin 34. Thus, the cooperation of hook-like formations 33 and 36 cause sighting device 25 to be in its most upward position shown in FIGURE 3.

Figure 3:
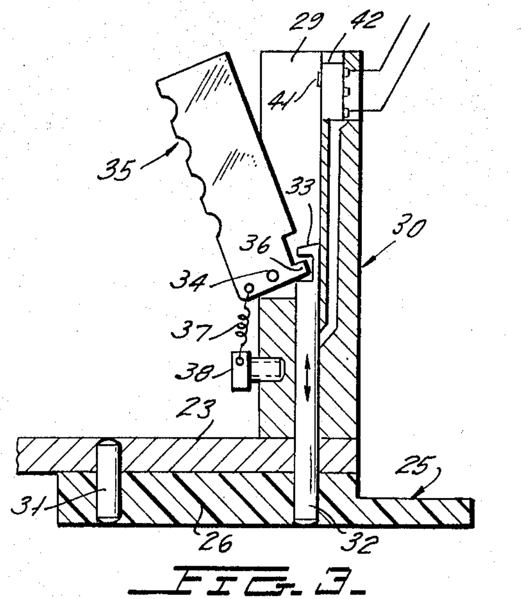
FIGURE 3 is a longitudinal cross section taken through the manually held post for moving the sighting device.

When trigger 35 is moved in a clockwise direction with respect to FIGURE 3 formation 33 of pin 32 is released. This permits sighting device 25 to move downwardly with respect to member 23 under the influence of gravity and hand pressure with the extent of this downward movement being limited by engagement with photomaster 45 on table 40. This downward movement may also be limited by any lost motion means well-known to the art. Continued clockwise movement of trigger 35 brings it into engagement with the actuating member 41 of switch 42 carried by post 30. The purpose of switch 42 will be hereinafter explained.

Figure 8:
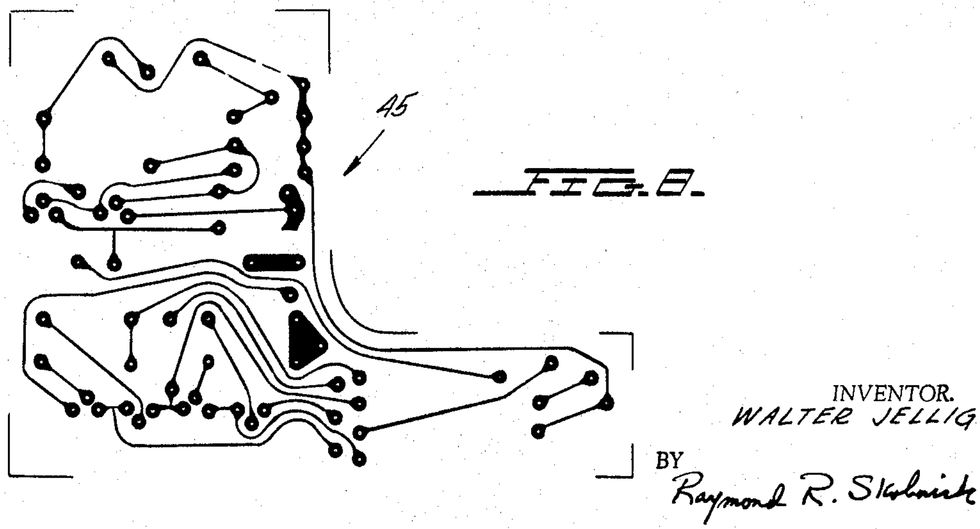
FIGURE 8 is a plan view of a photomaster upon which the optical device is sighted.

Sighting device 25 is mounted over table 40 which is provided with an electroluminescent insert 44 upon which photomaster 45 is mounted. (Insert 44 is a light source for illuminating photomaster 45.) As most clearly seen in FIGURE 8, photomaster 45 contains a pattern defining circuit conductors and is the very pattern found on the printed circuit boards mounted on work table 15. The central portions of the enlargements or pads, at the extremities of the printed circuit conductors, and elsewhere, are transparent so that light shining from electroluminescent insert 44 through photomaster 45 illuminates the center of the pads. These are the points upon which the intersection of cross hairs 27 and 28 is sighted.

Operation of so much of machine 10 as hereinbefore described takes place as follows: A stack of printed circuit boards are mounted to table 15, being forced against indexing strips 51 by clamps 52. The operator holds trigger post 30 and maneuvers sighting device 25 to a position where the intersection of cross hairs 27 and 28 blocks out the light shining through the center portion of the pad of photomaster 45 indicating the desired drilling point. It should be apparent that movement of sighting device 25 will cause a corresponding movement of work table 15. Thus, when sighting device 25 is properly positioned the stack of printed circuit board 50 is properly positioned beneath drill 14 so that after clamping of table 15, drilling may take place.

Figure 2:
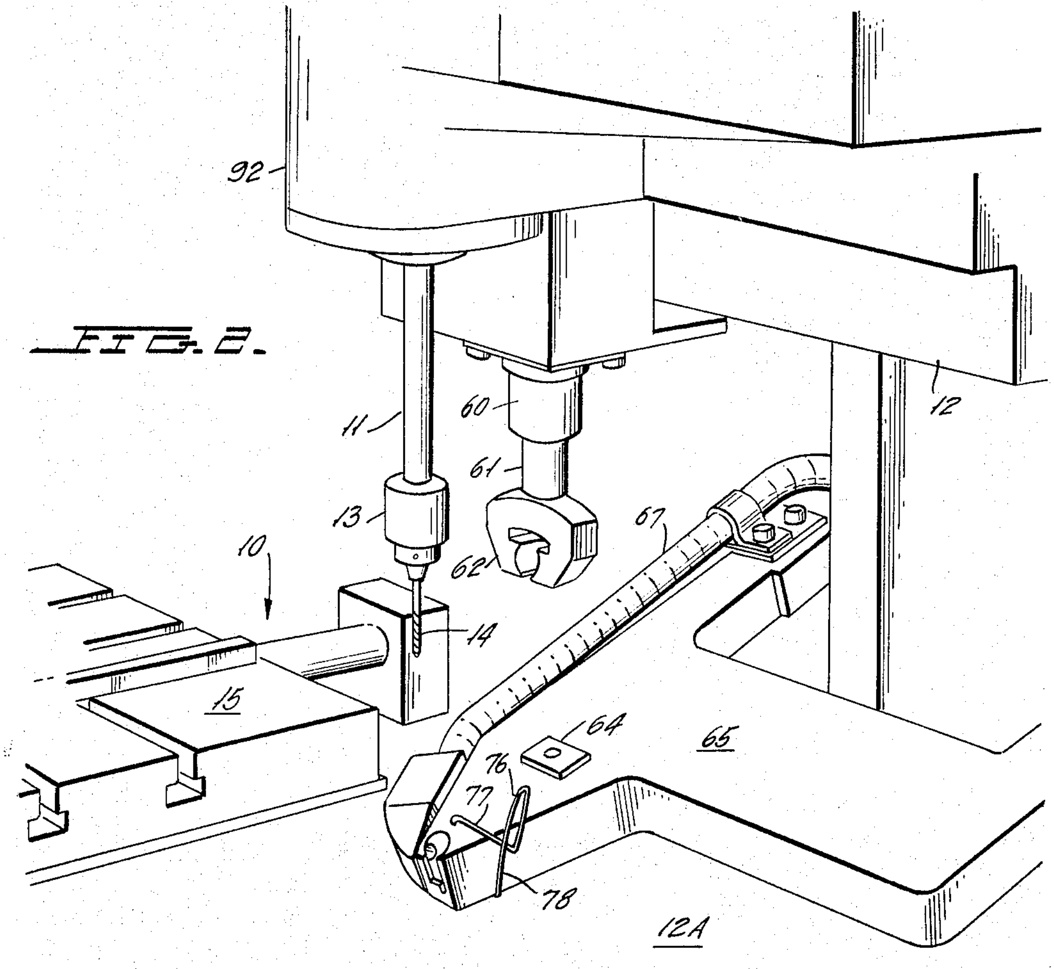
FIGURE 2 is a fragmentary perespective of the machine illustrated in FIGURE 1 with the clamping device released so as to permit the changing of the drill bit.

The clamp means for work table 15 includes air cylinder 60, mounted to the rear of spindle 11, and having an ejectable piston 61. Cylinder 60 is so constructed that downward movement of piston 61 is controlled by air pressure while upward movement is controlled by a spring (not shown). The lower end of piston 61 carries permanent magnet 62 in the form of a horseshoe whose open end faces downwardly. Clamp 65 is a plate-like member which is secured at its rear portion to frame 12 by means of a pivotal mounting. With soft iron member 64 attracted by magnet 62 the position of clamp 65 is controlled by cylinder 60. When member 64 is not attracted by magnet 62, clamp 65 pivots downwardly under the influence of gravity and comes to rest upon the bed 12*a* of frame 12 (FIGURE 2). In this position plate 65 is completely clear of drill 14. Suction hose 67, carried by clamp 65, is provided with a forward opening through which chips are cleared away during the drilling operation.

Figure 5:
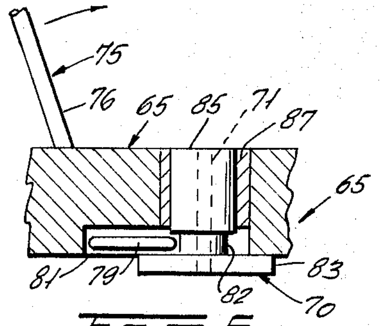
FIGURE 5 and FIGURE 6 are fragmentary cross sections illustrating the manner in which the drill guide is mounted to the clamping device.

When member 64 is held by magnet 62, clamp 65 is so positioned that drill 14 extends into the axial bore 71 of hardened steel insert 70 which is removably mounted by means of spring retainer 75 at the forward end of clamp 65. Retainer 75 is a shaped rod constructed of spring material. Retainer 75 includes handle portion 76, clamp portions 77 and 78 at right angles to one another, and retainer portion 79 at right angles to portion 78. Retainer 75 is pivotally mounted to clamp 65 with the latter having recess 81 on the bottom surface thereof to receive retainer portion 79 when retainer portion 79 is in locking position as in FIGURE 5. In this position the forward, or free, end of retaining portion 79 is disposed within the angular undercut section 82 of member 70 so as to prevent axial movement of member 70. The enlarged shoulder portion 83 at the lower end of member 70 rests against printed circuit board stack 50 when clamp 65 is moved downward into clamping position. Central bore 71 of member 70 serves to guide drill 14 along a truly vertical path. The diameter of bore 71 is only slightly greater than the outer diameter of drill 14 to not only guide drill 14, but also to effectively prevent the formation of burrs during the drilling operation.

Figure 6:
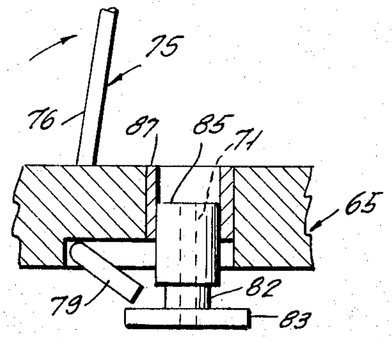
Figure 4:
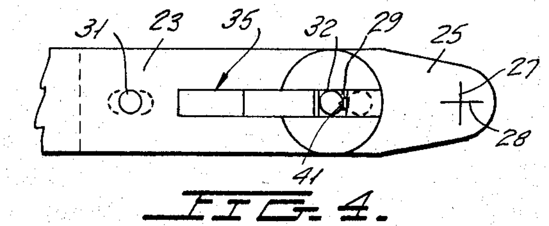
FIGURE 4 is a plan view of the post and sighting device of FIGURE 3.

In the release position (FIGURE 6) for retainer 75, the free end of retainer portion 79 is pivoted to a position clear of the main portion of member 70. This enables member 70 to be withdrawn downwardly from the hardened cylindrical insert 87 carried by clamp 65.

Figure 7:
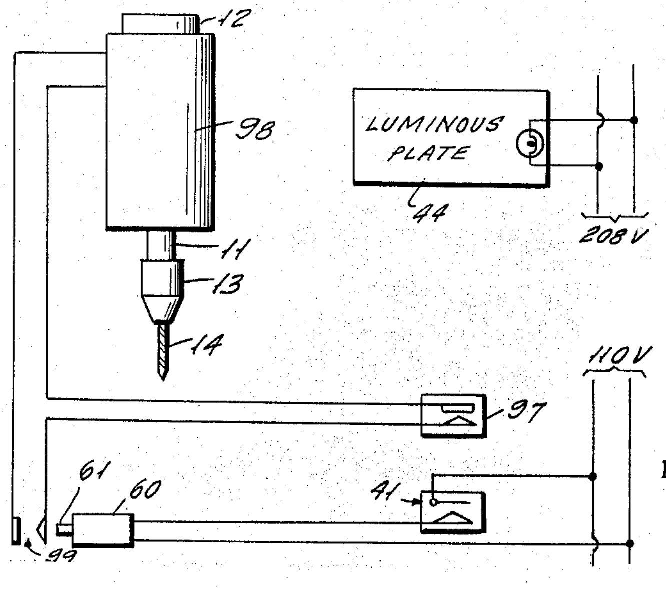
FIGURE 7 is an electro-mechanical schematic of the machine illustrated in FIGURE 1.

For an understanding of the overall operation of machine 10 particular reference is made to FIGURE 7. When trigger 35 carried by post 30 is fully depressed, this acts to close switch 41 thereby energizing clamp actuating cylinder 60. As piston 61 moves downwardly clamp 65 is operated to clamping position and when the latter has finally reached this position interlock switch 99 will be closed. Thereafter foot switch 97 is closed so that drill head 98 is energized. In a manner well-known to the art, upon energization of drill head 98 spindle 11 is caused to rotate and move downwardly causing bit 14 to drill through the stack of printed circuit boards 50 and when the drilling operation is completed bit 14 is automatically retracted and spindle 11 is caused to cease rotation.

Thus, it is seen that the instant invention provides a novel machine for the drilling of printed circuit boards. The inclusion of a sighting device movable in unison with the work table enables both sighting and drilling to take place from the same side of the table without the necessity of removing the sighting head and replacing it by a drill. More particularly, this is accomplished by sighting on a photomaster positioned remote from the stack of circuit boards to be drilled with this master being the same master used to form the conductive pattern on the printed circuit boards of the stack being drilled. The inclusion of novel clamping means prevents the formation of burrs.

Although there has been described a preferred embodiment of this novel invention, many variations and modifications will now be apparent to those skilled in the art. Therefore, this invention is to be limited, not by the specific disclosure herein, but only by the appending claims.

The embodiments of the invention in which an exclusive privilege or property is claimed are defined as follows:

1. A machine of the class described including a work table, a device for operating upon blanks supported on said work table, first means mounting said device for vertical movement toward and away from said work table, second means mounting said work table for movement in a horizontal plane relative to said device, a table for supporting a master, sighting means positioned above said table, third means securing said work table and said sighting means to each other for horizontal movement in unison whereby movement of said sighting device to a selected position relative to a point on a master supported by said table automatically moves said work table to a correct position relative to said device, a clamp for maintaining said work table in fixed position while said device is in operation, fourth means for operating said clamp into a holding position, a quick release connecting means between said clamp and said fourth means, guide means carried by said clamp for directing movement of said device, pivotal mounting means for said clamp, said connecting means including a permanent magnet holding means.

2. A machine as set forth in claim 1 in which there are means releaseably securing said guide means to said clamp.

3. A machine of the class described including a work table, a device for operating upon blanks supported on said work table, first means mounting said device for vertical movement toward and away from said work table, second means mounting said work table for movement in a horizontal plane relative to said device, positioning means including first and second sections mounted for relative horizontal movement, one of said sections including a table for supporting a master and the other of said sections including locating means positioned above said table, third means securing one of said sections and said work table to each other for horizontal movement in unison whereby selected relative positioning of said locating means and a point on a master supported by said table automatically moves said work table to a correct position relative to said device, a clamp for maintaining said work table in fixed position while said device is in operation, fourth means for operating said clamp into a holding position, a quick release connecting means between said clamp and said fourth means, guide means carried by said clamp for directing movement of said device.

4. A machine as set forth in claim 3 including pivotal mounting means for said clamp, said connecting means including a permanent magnet holding means.

5. A machine as set forth in claim 3 in which there are means releasably securing said guide means to said clamp.

References Cited by the Examiner

UNITED STATES PATENTS

| | | | |
|---|---|---|---|
| 2,816,465 | 12/1957 | Honnef | 77—64 |
| 2,975,661 | 3/1961 | Coleman | 77—32.2 |
| 3,180,183 | 4/1965 | Stanley et al. | 77—5 |

FRANCIS S. HUSAR, *Primary Examiner.*